US012771071B2

(12) United States Patent
Nishitani et al.

(10) Patent No.: US 12,771,071 B2
(45) Date of Patent: Oct. 20, 2026

(54) CONNECTOR WITH CANTILEVER LOCK ARM HAVING COLLISION SURFACES FOR PRODUCING CONNECTION SOUND

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Akihiro Nishitani, Mie (JP); Kenji Makino, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 335 days.

(21) Appl. No.: 18/684,338

(22) PCT Filed: Jun. 29, 2022

(86) PCT No.: PCT/JP2022/026063
§ 371 (c)(1),
(2) Date: Feb. 16, 2024

(87) PCT Pub. No.: WO2023/026689
PCT Pub. Date: Mar. 2, 2023

(65) Prior Publication Data

US 2024/0364053 A1 Oct. 31, 2024

(30) Foreign Application Priority Data

Aug. 27, 2021 (JP) ................................ 2021-138759

(51) Int. Cl.
*H01R 13/64* (2006.01)
*H01R 13/639* (2006.01)

(52) U.S. Cl.
CPC ........... *H01R 13/639* (2013.01); *H01R 13/64* (2013.01)

(58) Field of Classification Search
None
See application file for complete search history.

(56) References Cited

U.S. PATENT DOCUMENTS 5,830,002 A 11/1998 Ito et al.
6,325,656 B1 * 12/2001 Fukuda .............. H01R 13/6272 439/358

(Continued)

FOREIGN PATENT DOCUMENTS

JP 2014-199747 A 10/2014
JP 2019-024023 A 2/2019

OTHER PUBLICATIONS

International Search Report issued on Sep. 20, 2022 for WO 2023/026689 A1 (4 pages).

*Primary Examiner* — Tho D Ta
(74) *Attorney, Agent, or Firm* — Venjuris, P.C.

(57) ABSTRACT

A connector is provided with a male housing including a receptacle, a female housing and a resiliently deformable lock arm formed on the female housing. The lock arm includes a pair of lock portions arranged in a width direction. The lock arm is resiliently deformed by the interference of the pair of lock portions and the receptacle in a connection process of the both housings. The lock arm resiliently returns to lock the both housings in a connected state when the both housings reach a properly connected state. The lock arm and the receptacle are formed with collision surfaces for producing a connection sound by colliding when the lock arm resiliently returns. The collision surfaces are arranged (Continued)

only at one location including a region between the pair of lock portions in the width direction.

8 Claims, 6 Drawing Sheets

(56) References Cited

U.S. PATENT DOCUMENTS

| | | | | |
|---|---|---|---|---|
| 9,509,076 | B2 * | 11/2016 | Hashimoto | H01R 13/422 |
| 10,483,677 | B2 * | 11/2019 | Iida | H01R 13/6271 |
| 10,498,075 | B2 * | 12/2019 | Yamanaka | H01R 13/639 |
| 2006/0272364 | A1 | 12/2006 | Mase et al. | |

* cited by examiner

CONNECTOR WITH CANTILEVER LOCK ARM HAVING COLLISION SURFACES FOR PRODUCING CONNECTION SOUND

CROSS REFERENCE TO RELATED APPLICATIONS

This application is a national phase of PCT application No. PCT/JP2022/026063, filed on 29 Jun. 2022, which claims priority from Japanese patent application No. 2021-138759, filed on 27 Aug. 2021, all of which are incorporated herein by reference.

TECHNICAL FIELD

The present disclosure relates to a connector.

BACKGROUND

Patent Document 1 discloses a connector configured to lock a connector housing and a mating connector housing in a connected state by connecting the connector housing including a second locking portion and the mating connector housing and fitting a high projection of the second locking portion into a fitting hole of the mating connector housing. In a connection process of the connector housing and the mating connector housing, the second locking portion is resiliently deformed by the contact of the high projection and the mating connector housing. If the connector housing and the mating connector housing are connected, the second locking portion hits the mating connector housing by a resilient restoring force thereof, thereby producing a connection sound.

PRIOR ART DOCUMENT

Patent Document

Patent Document 1: JP 2014-199747 A

SUMMARY OF THE INVENTION

Problems to be Solved

In the above connector, it is considered as a means for enhancing a locking function by the second locking portion to form two high projections arranged in a width direction on one second locking portion. Parts of the second locking portion for hitting the mating connector housing are at the same positions as the high projections in the width direction. Thus, if the two high projections are formed, two hitting parts are arranged in the width direction. In this case, if the second locking portion is inclined in the connection process of the connector housing and the mating connector housing, connection sound production timings at the two hitting parts deviate, whereby the connection sound is reduced.

A connector of the present disclosure was completed on the basis of the above situation and aims to reliably produce a connection sound by the resilient return of a lock arm.

Means to Solve the Problem

The present disclosure is directed to a connector with a male housing including a receptacle, a female housing to be connected to the male housing, and a resiliently deformable lock arm formed on the female housing, the lock arm including a pair of lock portions arranged in a width direction intersecting a connection direction of the male housing and the female housing, the lock arm being resiliently deformed by interference of the pair of lock portions and the receptacle in a connection process of the male housing and the female housing, the lock arm resiliently returning to lock the male housing and the female housing in a connected state when the male housing and the female housing reach a properly connected state, the lock arm and the receptacle being formed with collision surfaces for producing a connection sound by colliding when the lock arm resiliently returns, and the collision surfaces being arranged only at one location including a region between the pair of lock portions in the width direction.

Effect of the Invention

According to the present disclosure, it is possible to reliably produce a connection sound by the resilient return of a lock arm.

DETAILED DESCRIPTION TO EXECUTE THE INVENTION

Description of Embodiments of Present Disclosure

Figure 1:
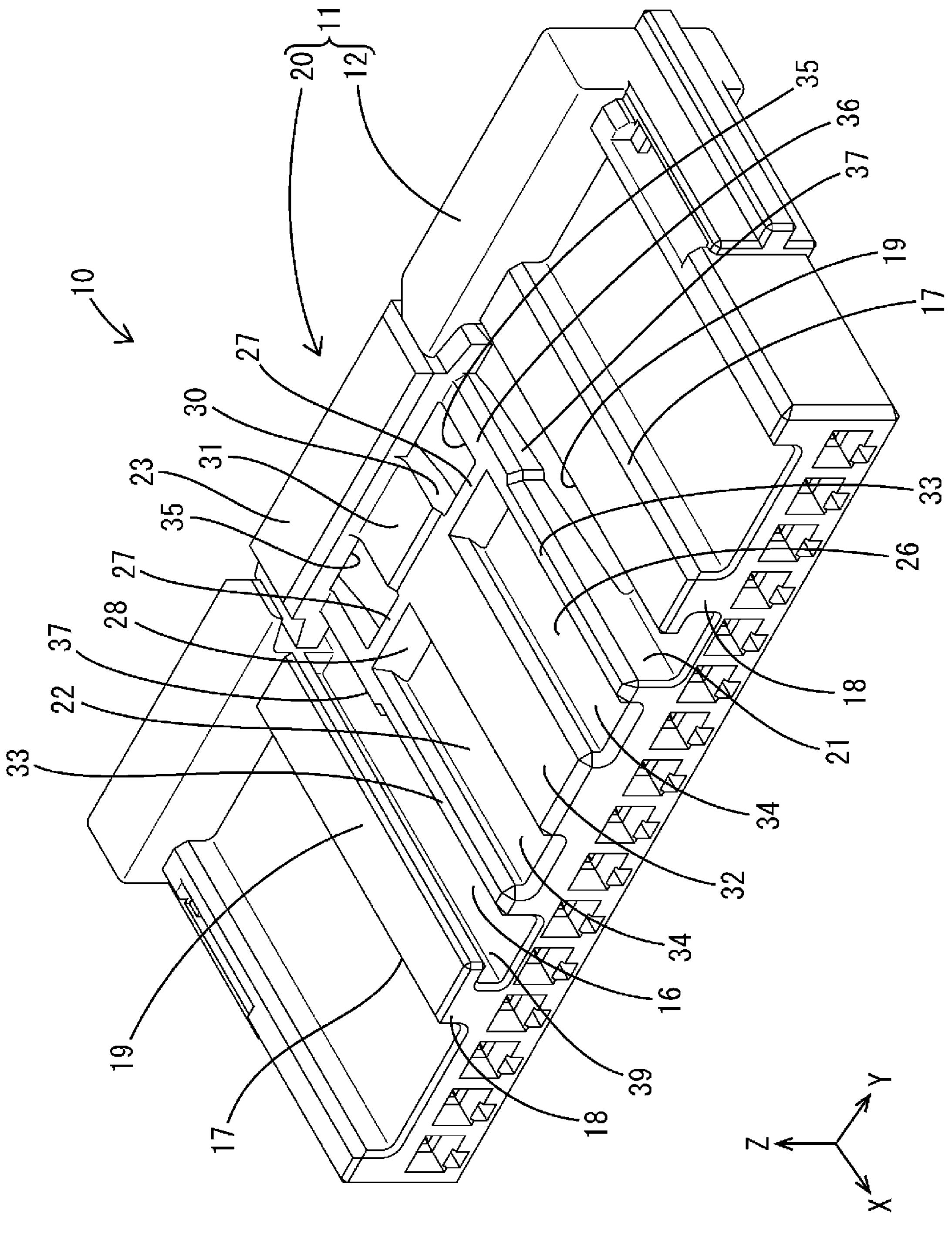
FIG. 1 is a perspective view of a female connector when viewed obliquely from an upper front side.

First, embodiments of the present disclosure are listed and described.

(1) The connector of the present disclosure is provided with a male housing including a receptacle, a female housing to be connected to the male housing, and a resiliently deformable lock arm formed on the female housing, the lock arm including a pair of lock portions arranged in a width direction intersecting a connection direction of the male housing and the female housing, the lock arm being resiliently deformed by interference of the pair of lock portions and the receptacle in a connection process of the male housing and the female housing, the lock arm resiliently returning to lock the male housing and the female housing in a connected state when the male housing and the female housing reach a properly connected state, the lock arm and the receptacle being formed with collision surfaces for producing a connection sound by colliding when the lock arm resiliently returns, and the collision surfaces being arranged only at one location including a region between the pair of lock portions in the width direction. According to the configuration of the present disclosure, since the collision surfaces are arranged only at one location including the region between the pair of lock portions, even if the male housing and the female housing are connected with the lock arm inclined, a connection sound can be reliably produced as when the lock arm is not inclined.

(2) Preferably, the collision surface is shaped to project with respect to a region adjacent to the collision surface via a step. According to this configuration, only the collision surfaces can be reliably caused to collide.

(3) Preferably, the female housing and the receptacle are formed with restricting portions for restricting deformation of the receptacle in a direction separating from the lock arm. According to this configuration, since collision energy when the collision surfaces collide with each other is not attenuated, a large connection sound can be produced.

(4) Preferably, the lock arm has a cantilever shape projecting rearward in the connection direction to the male housing from a base end portion connected to the female housing, and a protrusion extending from the base end portion to the collision surface is formed on an outer surface of the lock arm where the collision surface is formed. According to this configuration, the region of the lock arm from the collision surface to the base end portion is made to have a large thickness and a high stiffness by the protrusion. In this way, a resilient restoring force when the lock arm is resiliently deformed is increased and a large connection sound can be produced.

(5) Preferably, the lock arm has a cantilever shape projecting rearward in the connection direction to the male housing from a base end portion connected to the female housing, and reinforcing ribs projecting in a direction parallel to a resilient deformation direction of the lock arm and extending rearward in the connection direction from the base end portion are formed on both side edge parts of the lock arm. According to this configuration, since the stiffness of the lock arm is enhanced by the reinforcing ribs, a resilient restoring force when the lock arm is resiliently deformed is increased and a large connection sound can be produced.

(6) Preferably in (5), the reinforcing ribs extend to the same region as a formation range of the collision surface in the connection direction of the male housing and the female housing. According to this configuration, since the stiffness of the lock arm is enhanced by the reinforcing ribs in the region where the collision surface is formed, collision energy when the collision surfaces collide with each other is not attenuated and a large connection sound can be produced.

(7) Preferably in (1) to (3), the lock arm has a cantilever shape projecting rearward in the connection direction to the male housing from a base end portion connected to the female housing, a protrusion extending from the base end portion to the collision surface is formed on an outer surface of the lock arm where the collision surface is formed, a pair of reinforcing ribs projecting in a direction parallel to a resilient deformation direction of the lock arm and extending rearward in the connection direction from the base end portion are formed on both side edge parts of the lock arm, the receptacle is formed with a pair of projection-like receiving portions to be locked by the pair of lock portions, and a pair of guide grooves for guiding the receiving portions in the connection process of the male housing and the female housing are formed between the protrusion and the pair of reinforcing ribs. According to this configuration, a large connection sound can be produced by enhancing the stiffness of the lock arm and inclination in the connection process of the male housing and the female housing can be prevented by guiding the receiving portions by the guide grooves.

(8) Preferably, a widened portion having a larger width than other regions is formed in the same region of the lock arm as a formation range of the collision surface in the connection direction of the male housing and the female housing. According to this configuration, since the stiffness of the lock arm is enhanced by the widened portion in the region where the collision surface is formed, collision energy when the collision surfaces collide with each other is not attenuated and a large connection sound can be produced.

DETAILS OF EMBODIMENT OF PRESENT DISCLOSURE

Embodiment

One specific embodiment of the present disclosure is described with reference to FIGS. 1 to 6. Note that the present invention is not limited to these illustrations, but is represented by claims and intended to include all changes in the scope of claims and in the meaning and scope of equivalents.

Figure 2:
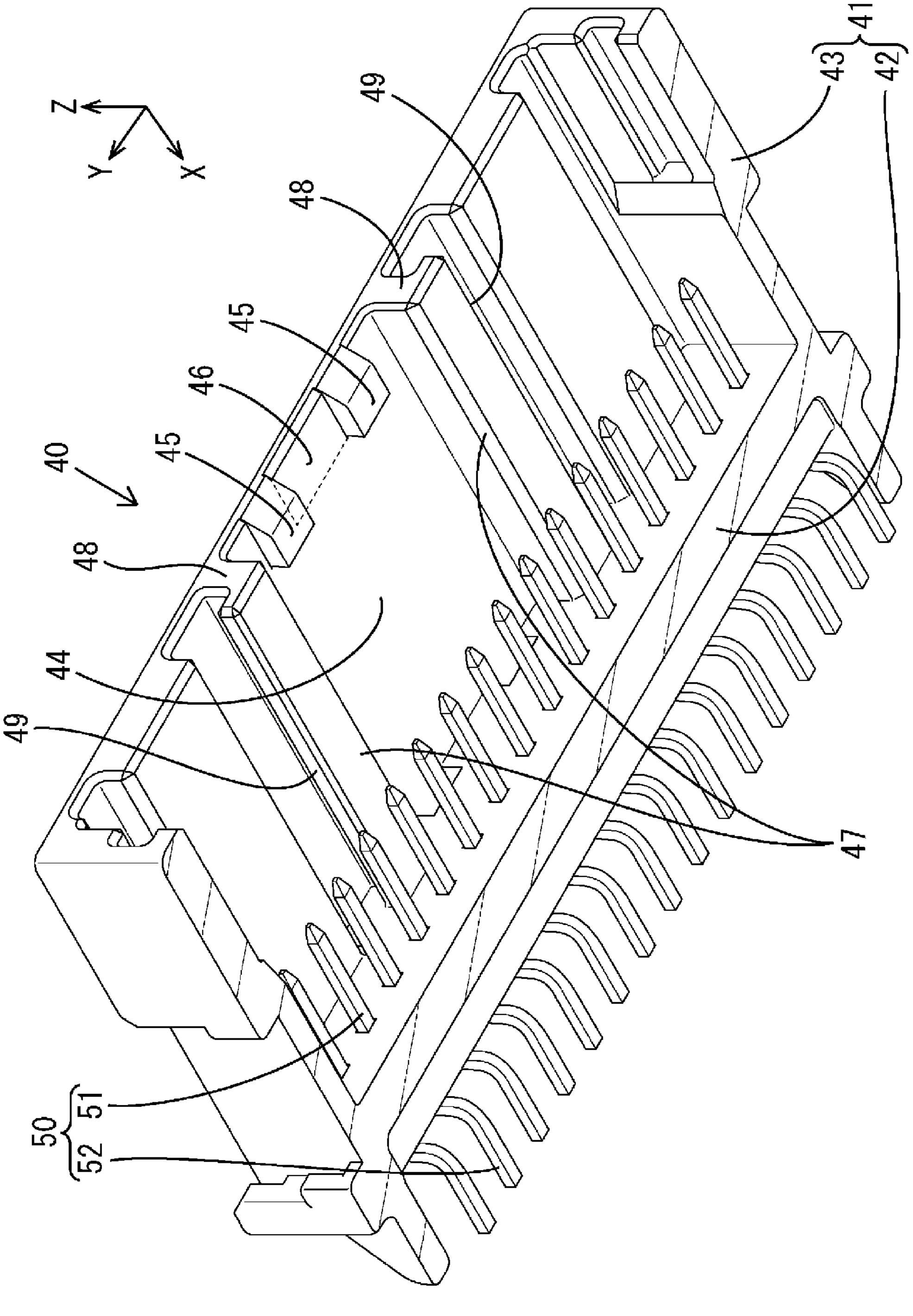
FIG. 2 is a perspective view partially cut away of a male connector when viewed obliquely from a lower front side.

A connector of this embodiment includes a female connector 10 and a male connector 40 connectable to and separable from each other. A connection direction and a separation direction of the both connectors 10, 40 are a front-rear direction. In this embodiment, a positive direction side of an X axis in FIGS. 1 to 6 is defined as a front side concerning the front-rear direction. The connection/separation direction of the both connectors 10, 40 is used as a synonym of the front-rear direction. A positive direction side of a Z axis in FIGS. 1 to 6 is defined as an upper side concerning a vertical direction. The vertical direction is a direction intersecting the connection direction of the male connector 40 and the female connector 10. The vertical direction and a height direction are used as synonyms. A positive direction side of a Y axis in FIGS. 1 and 2 is defined as a right side concerning a lateral direction. The lateral direction and a width direction are used as synonyms. The width direction is a direction intersecting the connection direction of the male connector 40 and the female connector 10.

<Female Connector 10>

The female connector 10 is configured by assembling a female housing 11 made of synthetic resin and a plurality of female terminal fittings 15. As shown in FIG. 1, the female housing 11 is a single component having a bilaterally symmetrical shape. The female housing 11 includes a housing body portion 12 and a lock arm 20 integrally formed to the housing body portion 12.

The housing body portion 12 has a flat rectangular parallelepiped shape as a whole. A width of the housing body portion 12 is larger than a length in the front-rear direction, and a height thereof is smaller than the width and the length. As shown in FIGS. 3 to 6, a plurality of terminal accommodation chambers 13 penetrating through the housing body portion 12 in the front-rear direction are formed at constant intervals in the width direction in the housing body portion 12. The female terminal fitting 15 fixed to a front end part of a wire 14 is inserted into each terminal accommodation chamber 13.

As shown in FIG. 1, a pair of bilaterally symmetrical female restricting portions 17 are formed on an outer wall surface 16 (upper surface) of the housing body portion 12. The pair of female restricting portions 17 are arranged apart from each other in the lateral direction. The female restricting portion 17 is linearly elongated in the front-rear direction. In a front view of the female housing 11, the female restricting portion 17 is bent into an L shape. In particular, the female restricting portion 17 includes a rising portion 18 elongated in the front-rear direction and a female locking portion 19 elongated in the front-rear direction. The rising portion 18 is in the form of a rib projecting upward from the outer wall surface 16 of the housing body portion 12. The female locking portion 19 is in the form of a rib projecting from the upper end edge of the rising portion 18 toward a widthwise central side of the housing body portion 12.

The lock arm 20 is arranged in a central part in the width direction of the female housing 11. The lock arm 20 is located between the pair of female restricting portions 17 in the width direction. A width of the lock arm 20 is set to be substantially ⅓ of the width of the female housing 11 (housing body portion 12). The lock arm 20 includes a base end portion 21, an arm body portion 22 and an operating portion 23.

The base end portion 21 constitutes a front end part of the lock arm 20 and is connected to a front end part of the outer wall surface 16 (upper surface) of the housing body portion 12. The arm body portion 22 is in the form of a flat plate as a whole and cantilevered rearward along the outer wall surface 16 of the housing body portion 12 from the base end portion 21. The arm body portion 22 is arranged to cover the outer wall surface 16 (upper surface) of the housing body portion 12 from above. The operating portion 23 projects upward from a rear end part of an outer surface 26 (upper surface) of the arm body portion 22. The outer surface 26 of the arm body portion 22 (lock arm 20) is a surface opposite to an inner surface facing the outer wall surface 16 of the female housing 11 in a resilient deformation direction (vertical direction) of the lock arm 20.

The lock arm 20 is normally held at a lock position (see FIGS. 1, 5 and 6) where the outer surface 26 of the arm body portion 22 is parallel to the outer wall surface 16 of the female housing 11. If a downward external force is applied to the lock arm 20, the lock arm 20 is resiliently deformable to a lock release position (see FIGS. 3 and 4) to bring the arm body portion 22 closer to the outer wall surface 16 of the female housing 11 with the base end portion 21 as a fulcrum. By pushing the operating portion 23, the lock arm 20 can be resiliently deformed from the lock position to the lock release position.

As shown in FIG. 1, a pair of bilaterally symmetrical lock portions 27 are formed on the outer surface 26 of the arm body portion 22 while being spaced apart in the width direction. Formation positions of the both lock portions 27 in the front-rear direction are behind a center of the arm body portion 22 and in front of the front end of the operating portion 23. The lock portion 27 is shaped to project upward from the outer surface 26 of the arm body portion 22. The front surface of the lock portion 27 is a flat surface inclined with respect to the connection/separation direction of the both connectors 10, 40 and functions as a guiding surface 28. The rear surface of the lock portion 27 is a flat surface perpendicular to the connection/separation direction and functions as a lock surface 29.

One base portion 30 is formed on the outer surface 26 of the arm body portion 22. In the front-rear direction, the base portion 30 is arranged between the operating portion 23 and the lock portions 27. The front end of the base portion 30 is connected to the rear end of a protrusion 32 to be described later. The rear end of the base portion 30 is connected to the front end of the operating portion 23. An entire region of the upper surface of the base portion 30 functions as a female collision surface 31, which is a flat surface parallel to the outer surface 26 of the arm body portion 22. Only one female collision surface 31 is formed on one lock arm 20. In a plan view of the lock arm 20 from above, the base portion 30 and the female collision surface 31 have a rectangular shape having a width larger than a dimension in the front-rear direction. The base portion 30 and the female collision surface 31 are arranged in a widthwise central part of the arm body portion 22. A formation range of the female collision surface 31 in the front-rear direction is a region behind a center of the arm body portion 22.

In particular, the front end of the female collision surface 31 is arranged at the same position as the lock surfaces 29 in the front-rear direction. The rear end of the female collision surface 31 is at the same position as the front end of the operating portion 23 in the front-rear direction. The entire female collision surface 31 is located behind the rear ends of the lock portions 27. A width of the female collision surface 31 is equal to or slightly larger than an interval between the pair of lock portions 27. A height of the female collision surface 31 from the outer surface 26 of the arm body portion 22, i.e. a projection height of the base portion 30, is slightly larger than projection heights of the lock portions 27 from the outer surface 26 of the arm body portion 22.

The protrusion 32 elongated in the front-rear direction is formed in a widthwise central part of the outer surface 26 of the lock arm 20. The protrusion 32 is continuously formed from the front end of the base end portion 21 to the front end of the base portion 30. A width of the protrusion 32 is equal to or slightly smaller than that of the female collision surface 31. The width of the protrusion 32 is constant over an entire length and equal to the interval between the pair of lock portions 27. A rear end part of the protrusion 32 and the lock portions 27 are connected. A projection height of the protrusion 32 from the outer surface 26 of the arm body portion 22 is equal to those of the lock portions 27.

The lock arm 20 is formed with a pair of bilaterally symmetrical reinforcing ribs 33. The pair of reinforcing ribs 33 project upward from the outer surface 26 of the arm body portion 22 and are elongated in the front-rear direction along both left and right side edges of the lock arm 20. A formation range of the reinforcing ribs 33 in the front-rear direction is a region from the front end of the base end portion 21 to the rear front end of the operating portion 23 and the rear end of the female collision surface 31. In the front-rear direction, the formation range of the reinforcing ribs 33 includes the entire formation range of the female collision surface 31. Projection heights of the reinforcing ribs 33 from the outer surface 26 of the arm body portion 22 are equal to those of the lock portions 27 and the protrusion 32. The reinforcing ribs 33 are connected to the lock portions 27.

A pair of bilaterally symmetrical guide grooves 34 are formed in the outer surface 26 of the lock arm 20. Both left and right side edges of the guide groove 34 are defined by the protrusion 32 and the reinforcing rib 33. The front end of the guide groove 34 is open in the front end surface of the lock arm 20. A pair of bilaterally symmetrical lock recesses 35 are formed in the outer surface 26 of the arm body portion 22. The pair of lock recesses 35 are spaces surrounded by both left and right side surfaces of the base portion 30, the rear surfaces (lock surfaces 29) of the lock portions 27 and the inner side surfaces of the reinforcing ribs 33, and rectangularly defined.

A widened portion 36 is formed on a rear end part of the lock arm 20. The widened portion 36 is configured by forming a pair of left and right protruding portions 37 on both left and right side surfaces (side surfaces on sides opposite to the lock recesses 35 in the width direction) of the reinforcing ribs 33. The widened portion 36 is constituted by the arm body portion 22 and the pair of protruding portions 37. A formation range of the widened portion 36 in the front-rear direction is a region from the front ends of the lock portions 27 to the front end of the operating portion 23. In the front-rear direction, the formation range of the widened portion 36 includes the entire female collision surface 31. A width of the widened portion 36 in the lock arm 20 is larger than the width of the lock arm 20 in a region where the widened portion 36 is not formed (region in front of the widened portion 36) by as much as the pair of protruding portions 37.

<Male Connector 40>

The male connector 40 is configured by assembling a male housing 41 made of synthetic resin and a plurality of male terminal fittings 50. The male connector 40 functions as a board connector to be mounted on a circuit board (not shown).

As shown in FIG. 2, the male housing 41 is a single component including a wall-like terminal holding portion 42 and a receptacle 43 in the form of a flat rectangular tube projecting toward the female connector 10 from the outer peripheral edge of the terminal holding portion 42. An upper wall portion 44 constituting the receptacle 43 is formed with a pair of bilaterally symmetrical receiving portions 45. The pair of receiving portions 45 project downward from the inner surface (lower surface) of the upper wall portion 44 and are arranged to face the opening end of the receptacle 43. In the width direction, the pair of receiving portions 45 are arranged at the same positions as the pair of lock portions 27.

A male collision surface 46 is formed in a lateral central part of the inner surface (lower surface) of the upper wall portion 44. Only one male collision surface 46 is formed in one receptacle 43. In a bottom view of the female housing 11, a formation range of the male collision surface 46 is a rectangular region to be contacted by the female collision surface 31 with the both connectors 10, 40 properly connected. A planar region between the pair of receiving portions 45 on the inner surface of the upper wall portion 44 functions as the male collision surface 46. Although a boundary between the male collision surface 46 and a region adjacent to the male collision surface 46 is shown by a broken line to clearly show the male collision surface 46 in FIG. 2, the male collision surface 46 is actually continuous and flush with the region adjacent to the male collision surface 46.

A pair of bilaterally symmetrical male restricting portions 47 are formed on the inner surface (lower surface) of the upper wall portion 44 of the receptacle 43. The pair of male restricting portions 47 are arranged apart from each other in the lateral direction. The male restricting portion 47 is linearly elongated in the front-rear direction. In a front view of the receptacle 43 from the side of the female connector 10, the male restricting portion 47 is bent into an L shape. In particular, the male restricting portion 47 includes a leg portion 48 elongated in the front-rear direction and a male locking portion 49 elongated in the front-rear direction. The leg portion 48 is in the form of a rib projecting downward from the upper wall portion 44 of the receptacle 43. The male locking portion 49 is in the form of a rib projecting from the lower end edge of the leg portion 48 toward a widthwise outer side of the receptacle 43.

The male terminal fitting 50 is formed by bending an elongated metal bar material. The male terminal fitting 50 includes a terminal connecting portion 51 extending in the front-rear direction and a board connecting portion 52 bent into an L shape. The terminal connecting portion 51 is passed through the terminal holding portion 42 in the front-rear direction. A tab on a tip part of the terminal connecting portion 51 is arranged in the receptacle 43. The board connecting portion 52 extends downward from the base end of the terminal connecting portion 51 outside the male housing 41 (receptacle 43). The board connecting portion 52 is connected to the circuit board.

<Functions of Connector of Embodiment>

In connecting the male housing 41 of the male connector 40 and the female housing 11 of the female connector 10, the female housing 11 is inserted into the receptacle 43. When the connection of the both connectors 10, 40 is started, the pair of female restricting portions 17 and the pair of male restricting portions 47 are fit and the pair of receiving portions 45 enter the guide grooves 34. The pair of male restricting portions 47 enter groove portions 39 between the lock arm 20 and the pair of female restricting portions 17.

Figure 3:
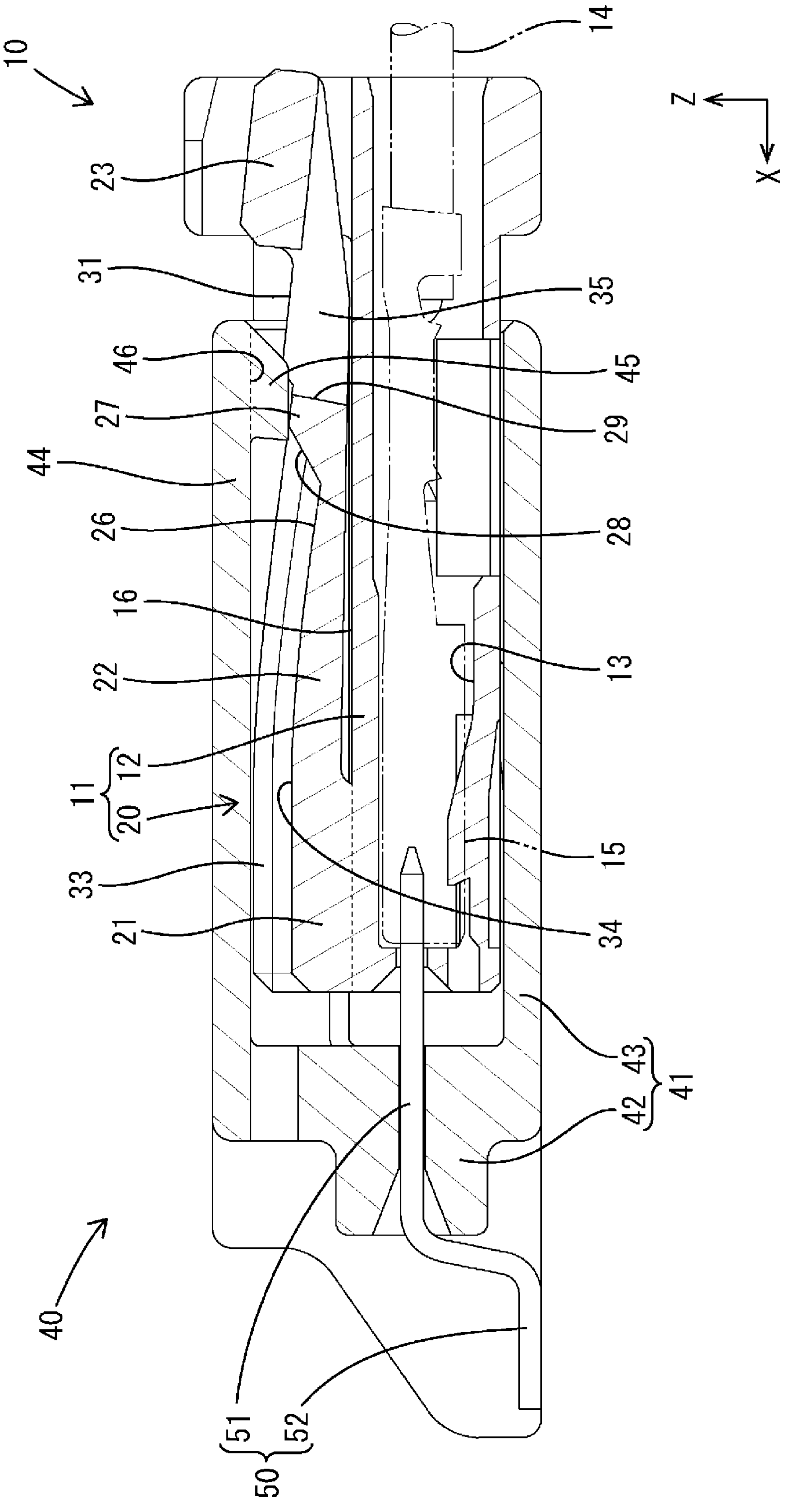
FIG. 3 is a side view in section with a lock portion cut perpendicular to a width direction in a connection process of the both connectors.
Figure 4:
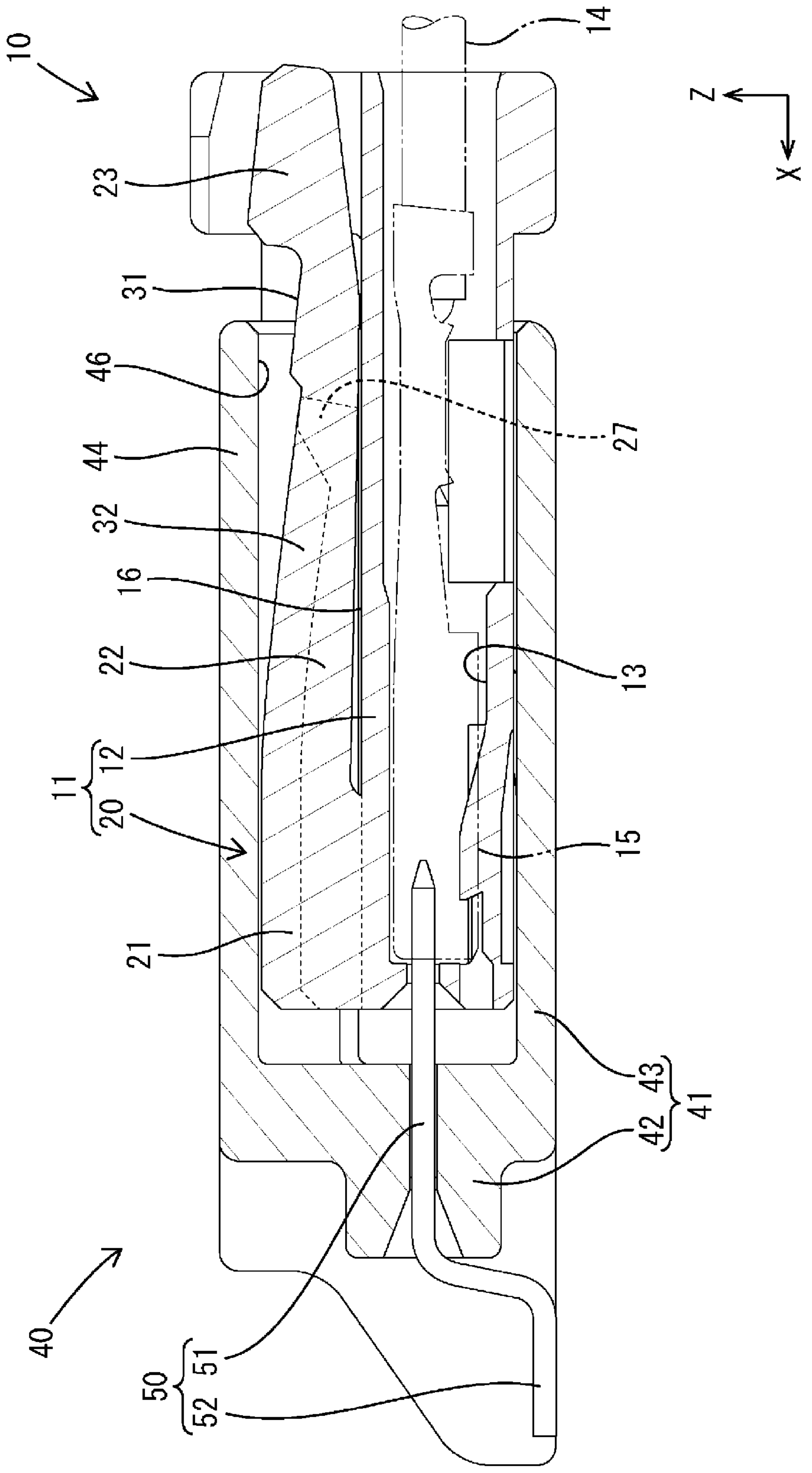
FIG. 4 is a side view in section with collision surfaces cut perpendicular to the width direction in the connection process of the both connectors.

If the connection of the both connectors 10, 40 proceeds up to a state immediately before a properly connected state, the pair of lock portions 27 and the pair of receiving portions 45 interfere and the lock arm 20 is resiliently deformed toward the outer surface 26 of the arm body portion 22 as shown in FIG. 3. If the lock arm 20 is resiliently deformed, the female collision surface 31 is displaced to a position largely separated downward from the male collision surface 46 as shown in FIG. 4. With the lock arm 20 resiliently deformed, the upper wall portion 44 of the receptacle 43 is pressed upward by a resilient restoring force of the lock arm 20. However, since the male locking portions 49 of the male restricting portions 47 come into contact with the female locking portions 19 of the female restricting portions 17 from below, the upper wall portion 44 is not displaced upward.

Figure 5:
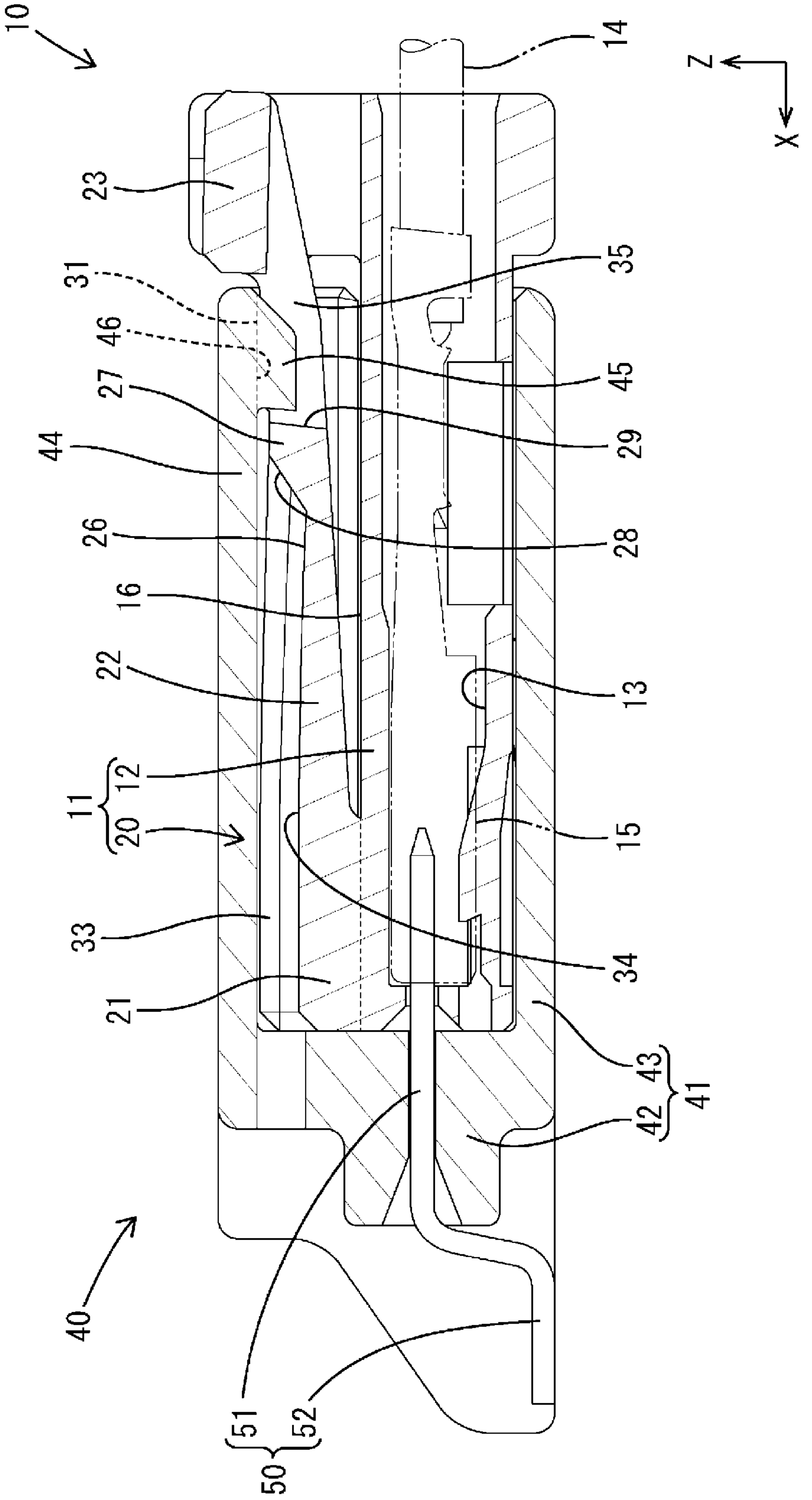
FIG. 5 is a side view in section with the lock portion cut perpendicular to the width direction in a state where the both connectors are properly connected.
Figure 6:
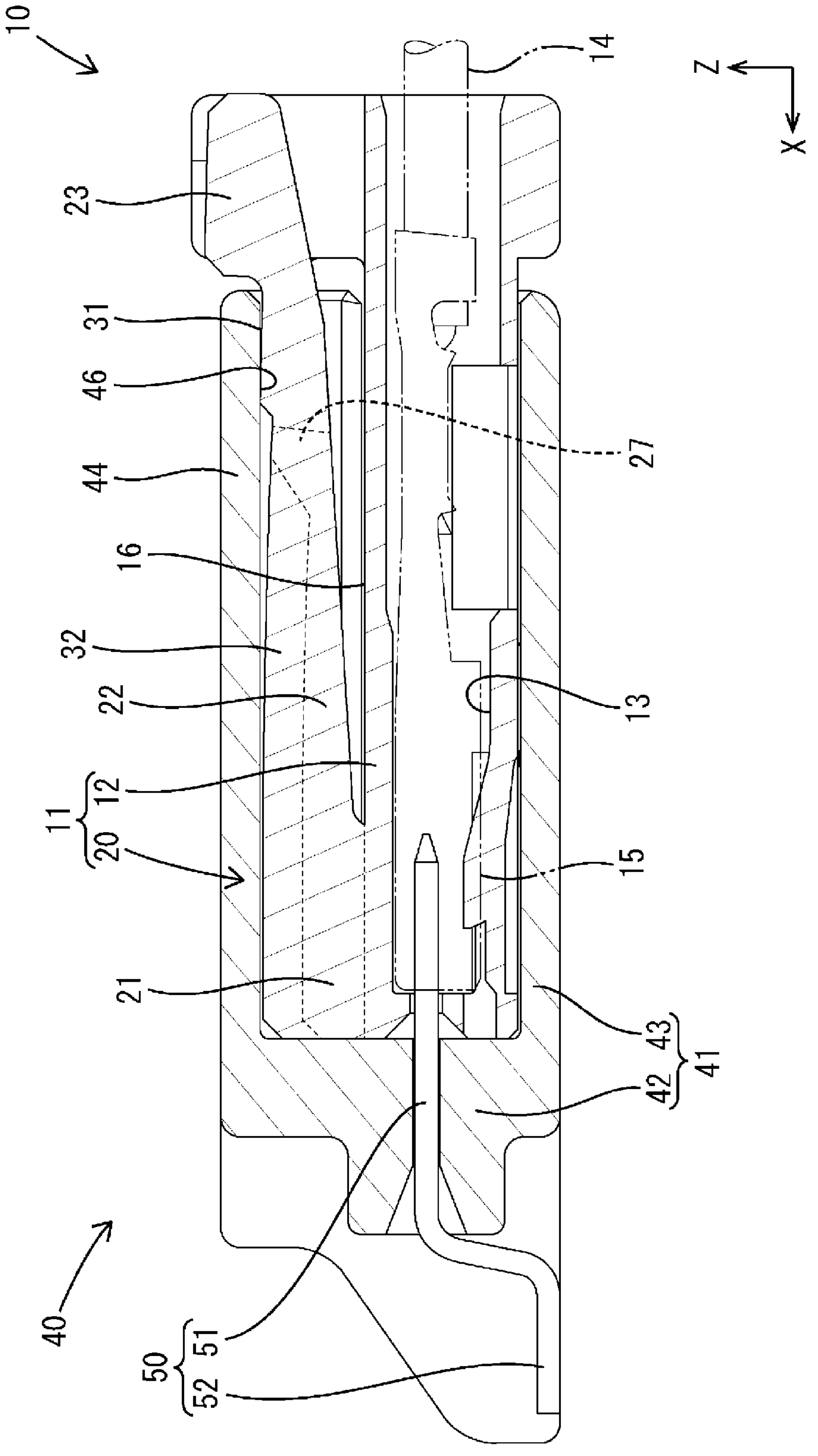
FIG. 6 is a side view in section with the collision surfaces cut perpendicular to the width direction in the state where the both connectors are properly connected.

If the both connectors 10, 40 reach the properly connected state, the pair of lock portions 27 pass through the pair of receiving portions 45 and the lock arm 20 resiliently returns from the lock release position to the lock position by the resilient restoring force of the lock arm 20 as shown in FIG. 5. In this way, the pair of lock surfaces 29 lock the pair of receiving portions 45 from front, wherefore rearward separation of the female connector 10 from the male connector 40 is restricted. The pair of receiving portions 45 are accommodated in the pair of lock recesses 35. In the above way, the both connectors 10, 40 are locked in the properly connected state by the lock arm 20.

If the both connectors 10, 40 reach the properly connected state and the pair of lock portions 27 are disengaged from the pair of receiving portions 45, the lock arm 20 resiliently returns upward with force. The lock arm 20 resiliently returns at once, whereby the female collision surface 31 collides with the male collision surface 46 from below to produce a connection sound (collision sound). When the female collision surface 31 collides with the male collision surface 46, the male collision surface 46 is held not to escape upward by the locking action of the both locking portions 19, 49 of the both restricting portions 17, 47. Therefore, collision energy of the female collision surface 31 with the male collision surface 46 is not attenuated and a large connection sound is produced.

Effects of Embodiment

The connector of the embodiment is provided with the male housing 41 including the receptacle 43 and the female housing 11 to be fit into the receptacle 43 of the male housing 41. The female housing 11 is formed with the resiliently deformable lock arm 20. The lock arm 20 includes the pair of lock portions 27 arranged in the width direction. In a connection process of the both connectors 11, 41, the lock arm 20 is resiliently deformed by the interference of the pair of lock portions 27 and the pair of receiving portions 45. When the both housings 11, 41 reach the properly connected state, the lock arm 20 resiliently returns to lock the both housings 11, 41 in the connected state.

The lock arm 20 and the receptacle 43 are formed with the female collision surface 31 and the male collision surface 46, which produce a connection sound by colliding when the lock arm 20 resiliently returns. The female collision surface 31 is arranged only at one location including the region between the pair of lock portions 27 in the width direction. The male collision surface 46 is also arranged only at one location including the region between the pair of receiving portions 45 (region between the pair of lock portions 27). Since the female collision surface 31 is arranged only at one location including the region between the pair of lock portions 27, even if the both housings 11, 41 are connected with the lock arm 20 inclined, a connection sound can be reliably produced as when the lock arm 20 is not inclined.

The female collision surface 31 is shaped to project with respect to the region adjacent to the female collision surface 31 (the upper surfaces of the pair of lock portions 27, the upper surface of the protrusion 32) via a step. According to this configuration, only the female collision surface 31 can be reliably caused to collide with the male collision surface 46.

The female housing 11 and the receptacle 43 are formed with the female restricting portions 17 and the male restricting portions 47 for restricting the deformation of the receptacle 43 in a direction separating from the lock arm 20 (female collision surface 31). According to this configuration, since collision energy when the female collision surface 31 and the male collision surface 46 collide is not attenuated, a large connection sound can be produced.

The lock arm 20 has a cantilever shape projecting rearward in the connection direction to the male housing 41 from the base end portion 21 connected to the female housing 11. The protrusion 32 extending from the base end portion 21 to the female collision surface 31 is formed on the outer surface 26 of the lock arm 20 formed with the female collision surface 31. According to this configuration, a region of the lock arm 20 from the female collision surface 31 to the base end portion 21 is made to have a larger thickness and a higher stiffness by the protrusion 32. In this way, a resilient restoring force when the lock arm 20 resiliently returns is increased and a large connection sound can be produced.

The pair of reinforcing ribs 33 projecting in a direction parallel to a resilient deformation direction of the lock arm 20 and extending rearward in the connection direction from the base end portion 21 are formed on both side edge parts of the lock arm 20. According to this configuration, since the stiffness of the lock arm 20 is enhanced by the pair of reinforcing ribs 33, a resilient restoring force when the lock arm 20 is resiliently deformed is large and a large connection sound can be produced.

The reinforcing ribs 33 extend to the same region as the formation range of the female collision surface 31 in the connection direction of the both housings 11, 41. According to this configuration, the stiffness of the lock arm 20 in the region where the female collision surface 31 is formed is enhanced by the reinforcing ribs 33. In this way, collision energy when the female collision surface 31 and the male collision surface 46 collide is not attenuated and a large connection sound can be produced.

The receptacle 43 is formed with the pair of projection-like receiving portions 45. The pair of receiving portions 45 are locked by the pair of lock portions 27. The pair of guide grooves 34 for guiding the receiving portions 45 in the connection process of the both housings 11, 41 are formed between the protrusion 32 and the pair of reinforcing ribs 33 in the outer surface 26 of the lock arm 20. According to this configuration, a large connection sound can be produced by enhancing the stiffness of the lock arm 20. Further, by guiding the pair of receiving portions 45 by the pair of guide grooves 34, inclination (prying) in the lateral direction in the connection process of the male housing 41 and the female housing 11 can be prevented.

The widened portion 36 having a larger width than other regions is formed in the same region of the lock arm 20 as the formation range of the female collision surface 31 in the connection direction (front-rear direction) of the both housings 11, 41. Both left and right end parts of the widened portion 36 protrude outward in the width direction from both left and right outer side surfaces (reinforcing ribs 33) of the lock arm 20. According to this configuration, the stiffness of the lock arm 20 is enhanced by the widened portion 36 in the region where the female collision surface 31 is formed. In this way, collision energy when the female collision surface 31 and the male collision surface 46 collide is not attenuated and a large connection sound can be produced.

The reinforcing ribs 33 are formed in the same region as the formation ranges of the lock portions 27 and the female collision surface 31 in the connection direction of the both connectors 10, 40. Since the reinforcing ribs 33 are made to have a larger width by the widened portion 36 in the same region as the formation range of the lock portions 27 and the formation range of the female collision surface 31 in the front-rear direction, the reinforcing ribs 33 are high in stiffness. Therefore, the attenuation of collision energy at the time of the collision of the female collision surface 31 and the male collision surface 46 can be suppressed.

OTHER EMBODIMENTS

The present invention is not limited to the above described and illustrated embodiment, but is represented by claims. The present invention is intended to include all changes in the scope of claims and in the meaning and scope of equivalents and also include the following embodiments.

The widths of the collision surfaces may be smaller or larger than the interval between the pair of lock portions.

At least a part of the collision surface of the lock arm may be arranged in a region overlapping the lock portions in the connection direction of the male housing and the female housing or the entire collision surface of the lock arm may be arranged only in a region closer to the base end portion than the lock portions.

The shape of the collision surface projecting with respect to the region adjacent to the collision surface via a step may be applied only to the collision surface of the receptacle or may be applied to the collision surfaces of both the lock arm and the receptacle.

The lock arm may be shaped not to include the protrusion extending from the base end portion to the collision surface.

The rear ends of the reinforcing ribs in the connection direction of the male housing and the female housing may be located at positions forward of (closer to the base end portion than) the rear end of the collision surface.

The lock arm may be shaped not to include the reinforcing ribs.

The lock arm may be shaped not to include the guide grooves.

The lock arm may be shaped not to include the widened portion.

LIST OF REFERENCE NUMERALS

10 . . . female connector
11 . . . female housing
12 . . . housing body portion
13 . . . terminal accommodation chamber
14 . . . wire
15 . . . female terminal fitting
16 . . . outer wall surface
17 . . . female restricting portion (restricting portion)
18 . . . rising portion
19 . . . female locking portion
20 . . . lock arm
21 . . . base end portion
22 . . . arm body portion
23 . . . operating portion
26 . . . outer surface
27 . . . lock portion
28 . . . guiding surface
29 . . . lock surface
30 . . . base portion
31 . . . female collision surface (collision surface)
32 . . . protrusion
33 . . . reinforcing rib
34 . . . guide groove
35 . . . lock recess
36 . . . widened portion
37 . . . protruding portion
39 . . . groove portion
40 . . . male connector
41 . . . male housing
42 . . . terminal holding portion
43 . . . receptacle
44 . . . upper wall portion
45 . . . receiving portion
46 . . . male collision surface (collision surface)
47 . . . male restricting portion (restricting portion
48 . . . leg portion
49 . . . male locking portion
50 . . . male terminal fitting
51 . . . terminal connecting portion
52 . . . board connecting portion

What is claimed is:

1. A connector, comprising:

a male housing including a receptacle;

a female housing to be connected to the male housing; and a resiliently deformable lock arm formed on the female housing, the lock arm including a pair of lock portions arranged in a width direction intersecting a connection direction of the male housing and the female housing, the lock arm being resiliently deformed by interference of the pair of lock portions and the receptacle in a connection process of the male housing and the female housing, the lock arm resiliently returning to lock the male housing and the female housing in a connected state when the male housing and the female housing reach a properly connected state, the lock arm and the receptacle being formed with collision surfaces for producing a connection sound by colliding when the lock arm resiliently returns, the collision surfaces being arranged only at one location including a region between the pair of lock portions in the width direction, and the lock arm has a cantilever shape projecting rearward in the connection direction to the male housing from a base end portion connected to the female housing.

2. The connector of claim 1, wherein the collision surface is shaped to project with respect to a region adjacent to the collision surface via a step.

3. The connector of claim 1, wherein the female housing and the receptacle are formed with restricting portions for restricting deformation of the receptacle in a direction separating from the lock arm.

4. The connector of claim 1, wherein a widened portion having a larger width than other regions is formed in the same region of the lock arm as a formation range of the collision surface in the connection direction of the male housing and the female housing.

5. The connector of claim 1, wherein:

the lock arm has a cantilever shape projecting rearward in the connection direction to the male housing from a base end portion connected to the female housing, and reinforcing ribs projecting in a direction parallel to a resilient deformation direction of the lock arm and extending rearward in the connection direction from the base end portion are formed on both side edge parts of the lock arm.

6. The connector of claim 5, wherein the reinforcing ribs extend to the same region as a formation range of the collision surface in the connection direction of the male housing and the female housing.

7. A connector, comprising:

a male housing including a receptacle;

a female housing to be connected to the male housing; and a resiliently deformable lock arm formed on the female housing, the lock arm including a pair of lock portions arranged in a width direction intersecting a connection direction of the male housing and the female housing, the lock arm being resiliently deformed by interference of the pair of lock portions and the receptacle in a connection process of the male housing and the female housing, the lock arm resiliently returning to lock the male housing and the female housing in a connected state when the male housing and the female housing reach a properly connected state, the lock arm and the receptacle being formed with collision surfaces for producing a connection sound by colliding when the lock arm resiliently returns, and the collision surfaces being arranged only at one location including a region between the pair of lock portions in the width direction, wherein:

the lock arm has a cantilever shape projecting rearward in the connection direction to the male housing from a base end portion connected to the female housing, and a protrusion extending from the base end portion to the collision surface is formed on an outer surface of the lock arm where the collision surface is formed.

8. A connector, comprising:

a male housing including a receptacle;

a female housing to be connected to the male housing; and a resiliently deformable lock arm formed on the female housing, the lock arm including a pair of lock portions arranged in a width direction intersecting a connection direction of the male housing and the female housing, the lock arm being resiliently deformed by interference of the pair of lock portions and the receptacle in a connection process of the male housing and the female housing, the lock arm resiliently returning to lock the male housing and the female housing in a connected state when the male housing and the female housing reach a properly connected state, the lock arm and the receptacle being formed with collision surfaces for producing a connection sound by colliding when the lock arm resiliently returns, and the collision surfaces being arranged only at one location including a region between the pair of lock portions in the width direction, wherein:

the lock arm has a cantilever shape projecting rearward in the connection direction to the male housing from a base end portion connected to the female housing, a protrusion extending from the base end portion to the collision surface is formed on an outer surface of the lock arm where the collision surface is formed, a pair of reinforcing ribs projecting in a direction parallel to a resilient deformation direction of the lock arm and extending rearward in the connection direction from the base end portion are formed on both side edge parts of the lock arm, the receptacle is formed with a pair of projection-like receiving portions to be locked by the pair of lock portions, and a pair of guide grooves for guiding the receiving portions in the connection process of the male housing and the female housing are formed between the protrusion and the pair of reinforcing ribs.

* * * * *